United States Patent [19]
Fornoff et al.

[11] 3,755,989
[45] Sept. 4, 1973

[54] REMOVAL OF MERCURY FROM GAS STREAMS

[75] Inventors: Louis Leonard Fornoff, Cedar Grove, N.J.; John Joseph Collins, Katonah; Charles Matthew Madigan, Bedford Hills, both of N.Y.

[73] Assignee: Union Carbide Corporation, New York, N.Y.

[22] Filed: June 16, 1972

[21] Appl. No.: 263,597

[52] U.S. Cl. .................................. 55/72, 55/74
[51] Int. Cl. .................................. B01d 53/04
[58] Field of Search .................. 55/72, 74, 387; 423/210

[56] References Cited
UNITED STATES PATENTS
1,984,164  12/1934  Stock .................................. 423/210
3,193,987  7/1965  Manes .................................. 423/210
3,257,776  6/1966  Park et al. ............................ 55/72

Primary Examiner—Charles N. Hart
Attorney—Paul A. Rose et al.

[57] ABSTRACT

Mercury vapor is removed from gas streams containing more than 60 percent relative humidity by raising the gas stream temperature to lower the relative humidity to less than 50 percent and thereafter selectively adsorbing the mercury vapor by passage through an activated carbon adsorbent bed under conditions such that water does not condense on the carbon adsorbent.

5 Claims, 1 Drawing Figure

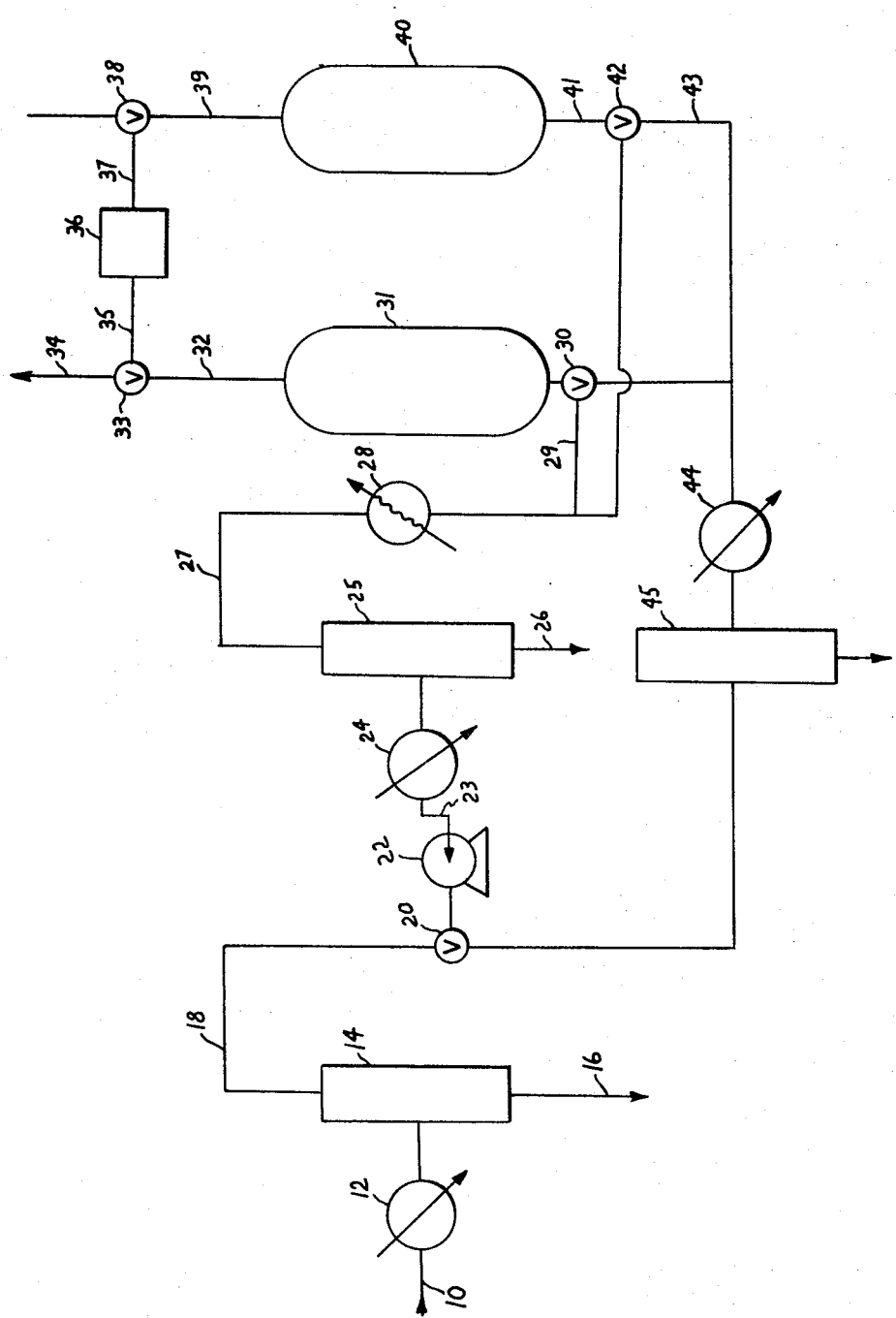

REMOVAL OF MERCURY FROM GAS STREAMS

The present invention relates, in general, to the removal of mercury from gas streams and, more particularly, to the prevention of atmospheric pollution by the selective adsorption of mercury from tail gas streams of various industrial processes.

In the commercial production of chlorine by the electrolysis of sodium chloride in which a metallic mercury containing electrode is employed, the electrolyzed sodium forms an amalgam with the mercury. Hydrolisis of the amalgam yields caustic soda, mercury and by-product hydrogen. The hydrogen is contaminated with the mercury which must be removed before disposal of the hydrogen as fuel or for recovery for other uses to prevent environmental pollution by mercury which, in one or more forms, is poisonous to virtually all living organisms. The hydrogen leaving the hydrolizer is also saturated with water vapor which need not be removed for most end uses of the hydrogen, but has been a complicating and costly factor in many processes heretofore proposed for mercury removal to the low concentrations new required. The common commercial adsorbents, including those of the molecular sieve type, must be employed in prohibitively large adsorption beds to have sufficient capacity to adsorb the water and still have sufficient capacity to adsorb the mercury. Because of this, it has been proposed to refrigerate the wet gas stream to 5°C. to condense a major proportion of the water and the mercury so that the adsorber size may be reduced. Such regrigeration is costly because of the very large volumes of gas involved. Chemical methods for removal of the mercury may avoid the water problem, but these then require the additional cost of recovering the chemically combined mercury for reuse instead of dispersing it to the environment.

It is, accordingly, the general object of the present invention to provide a process for lowering the concentration of mercury in wet gas streams to levels at which the gas streams can be safely vented to the atmosphere and for recovering the mercury in a readily useable form.

In accordance with the present invention, there is provided a process which comprises, (1) providing a gas stream having a temperature of from 32°F. to 100°F., a water relative humidity of greater than 60 percent, and being saturated with mercury vapor (a) increasing the temperature of said gas stream sufficient to lower the relative humidity to less than 50 percent, preferably to less than 40 percent, (3) thereafter feeding the gas stream into a fixed adsorption bed consisting essentially of adsorbent carbon whereby the mercury is selectively adsorbed and a mercury mass transfer zone is established and moves toward the egress end of said adsorption bed; (4) terminating feeding of the gas stream to the adsorption bed prior to the time of breakthrough of the mercury mass transfer zone; and (5) regenerating the adsorption bed by desorbing the mercury therefrom.

The gas stream treated in accordance with the present process can arise from many industrial sources. A major source is the mercury-containing by-product hydrogen stream from a chlor-alkali plant, as mentioned hereinbefore. Another source derived from mercury cell chlorine processes is the end box seal air. Mercury is also frequently present in ore furnace stack gases, the vent streams from laboratory glassware calibrating stations, and the vent gases from battery disposal or incineration operations. Removal of mercury from these latter types of gas streams is also feasible using the present invention.

The constituents and the relative proportions thereof in suitable treated gas streams are thus not narrowly critical factors, but at the adsorption bed temperature employed, any condensible component must be limited to not greater than 50 percent, preferably not greater than 40 percent, of its saturation pressure. Further, to maintain the sorptive capacity of the bed, gas stream constituents which are strongly reactive with the carbon adsorbent or which are strongly sorbed by activated carbon should be avoided to the extent which is practical. Halogens and ozone for example are preferably not present in the gas streams in concentrations of more than about 1 volume percent. By far, the most commonly treated gas streams in accordance with the present invention comprise mercury, water, and one or more of hydrogen, nitrogen, air, carbon monoxide and carbon dioxide.

The particular carbon adsorbent employed in the process is not critical and can be any of the commercially available materials conventionally employed as adsorbents in gas stream purification. These are in the main the so-called activated carbon or charcoal adsorbents such as are derived from the controlled pyrolysis of woods, coconut shells, fruit pits, cohune or babassu nut shells. The carbon adsorbent can, if desired, be supplemented with minor amounts of other non-carbon adsorbents, as for example zeolitic molecular sieves, which exhibit a capacity to adsorb mercury and/or water vapor.

Although we do not wish to be bound by any particular theory, it appears that the operability of the present process is due in large measure to the reduction in intensity of a heat front passing through the adsorbent bed. This front ordinarily arises from the heat of adsorption of adsorbate molecules and the heat of condensation arising from the formation of a liquid phase from condensibles such as water in the pores of the carbon adsorbent. By controlling the saturation pressure of the water and any other condensible in the gas stream being treated, a large proportion of these constituents pass harmlessly through the adsorbent bed without causing a net increase in bed temperature. Thus, the vapor pressure of the mercury adsorbate is not sharply increased with a resulting decrease of the capacity of the bed to retain mercury.

The process is illustrated by the following example in conjunction with the drawing which is a flow diagram of a preferred embodiment.

With reference to drawing, a by-product hydrogen stream at 50°F., at essentially atmospheric pressure and saturated with mercury vapor from a chlor-alkali plant sodium amalgam decomposer is introduced by line 10 to cooler 12 and separator 14 which condenses some water vapor and some mercury from the gas stream. Liquid water and any entrapped mercury are removed from the system through line 16. The gaseous constituents, comprising hydrogen, water vapor at a relative humidity of about 100 percent and saturated with mercury vapor and containing some mercury mist are passed through line 18 and valve 20 to compressor 22 which raises the gas stream pressure to about 9 psig. and forces the gas stream through line 23 into cooler 24 which lowers the gas stream temperature to the range of 50° to 65°F. before passing it to separator 25 wherein additional water vapor and mercury is condensed and removed from the system through line 26. The gas stream remaining is passed by line 27 into heater 28 which raises the temperature 30°F. Thereafter, the gas stream, which now has a relative humidity of about 40 percent is fed via line 29 and valve 30 into adsorbent bed 31 containing activated carbon. Mercury is adsorbed on the carbon adsorbent as is a small percentage of the water vapor of the gas stream, but the major proportion of water vapor leaves the adsorbent bed through line 32 along with the hydrogen. Valve 33 is controlled such that a major proportion of the purified hydrogen stream is removed from the system through line 34 for ultimate consumption and a minor proportion, about 15–20 percent is directed through line 35, heater 36 where it is heated to 500°F. to 650°F., then through line 37, valve 38, line 39 and adsorbent bed 40 having the same configuration and adsorbent as bed 31. Bed 40, at the beginning of the adsorption stroke in bed 31, has just erminated a similar adsorption step and is hence ready to undergo desorption of the mercury it contains. The hot purified hydrogen gas stream entering bed 40 through line 39 heats the bed and desorbs the mercury from bed 40 and the entire effluent is passed through line 41, valve 42 and line 43 to cooler 44 and separator 45 which serve to reduce the mercury and water content before passage through valve 20 in combination with untreated gas stream newly entering the system through line 18. After desorption of the mercury from bed 40, heating of the gas stream from line 35 is terminated and the resulting cool gas stream entering bed 40 returns the bed to temperature for a subsequent adsorption stroke, which is commenced prior to breakthrough of the mercury from adsorbent bed 31.

It will be obvious to those skilled in the art that whereas the above-illustrated process embodiment employs a recycle principle to the effect that essentially all of the mercury is removed from the system in liquid form, other methods of dealing with the desorbed mercury are readily employed. For example, the effluent purge gas stream from a desorbing bed contains, at least over an ascertainable period of time a much higher concentration of mercury than the initial gas stream being treated. This makes cryogenic removal of the mercury much more feasible than would be the case in attempting cryogenic treatment of the initial gas stream. As another example, a purge gas stream of a readily condensible substance such as water (steam) or benzene can be used solely to desorb the mercury from the adsorbent bed with subsequent condensation of the purge gas and mercury in a chamber which permits the egress of only liquid phase. The resulting condensed mercury is easily separated from the condensed purge gas substance.

What is claimed is:

1. Process for decreasing the mercury content of wet gas streams which comprises (1) providing a gas stream having a temperature of from 32°F. to 100°F., a water relative humidity of greater than 60 percent, and being saturated with mercury vapor; (2) increasing the temperature of said gas stream sufficiently to lower the relative humidity to less than 50 percent, (3) thereafter feeding the gas stream into a fixed adsorption bed consisting essentially of adsorbent carbon whereby the mercury is selectively adsorbed, a purified product gas stream passes from the adsorption bed, and a mercury mass transfer zone is established and moves toward the egress end of said adsorption bed; (4) terminating feeding of the gas stream to the adsorption bed prior to the time of breakthrough of the mercury mass transfer zone; and (5) regenerating the adsorption bed by desorbing the mercury therefrom.

2. Process according to claim 1 wherein in step (2) the temperature of the gas stream is increased sufficiently to lower the relative humidity, to less than 40 percent.

3. Process according to claim 1 wherein the gas stream being treated comprises hydrogen, mercury vapor and water vapor.

4. Process according to claim 1 wherein the bed regeneration of step (5) is accomplished by heat the bed and desorbing the mercury therefrom using a purge gas stream having essentially the same composition as the purified products gas stream of step (3), said purge gas stream being at a temperature of from about 500°F to about 750°F.

5. Process according to claim 1 wherein at least a portion of the mercury desorbed in regeneration step (5) is recycled and combined with the gas stream of step (1).

* * * * *